(12) United States Patent
Matsuo et al.

(10) Patent No.: US 7,987,818 B2
(45) Date of Patent: *Aug. 2, 2011

(54) ANIMAL LITTER BOX

(75) Inventors: Takayuki Matsuo, Tokyo (JP); Takeshi Ikegami, Tokyo (JP); Kenji Hiroshima, Tokyo (JP); Nobuaki Namikawa, Toyama (JP)

(73) Assignee: Uni-Charm Corporation, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,356

(22) Filed: Sep. 17, 2010

(65) Prior Publication Data

US 2011/0000435 A1    Jan. 6, 2011

Related U.S. Application Data

(63) Continuation of application No. 12/117,370, filed on May 8, 2008, now Pat. No. 7,832,357.

(30) Foreign Application Priority Data

Jun. 29, 2007 (JP) .................................. 2007-173554

(51) Int. Cl.
*A01K 29/00* (2006.01)
(52) U.S. Cl. ....................................................... 119/168
(58) Field of Classification Search ........... 119/161–170
See application file for complete search history.

(56) References Cited

U.S. PATENT DOCUMENTS

| | | | |
|---|---|---|---|
| 4,096,827 A | 6/1978 | Cotter | |
| 4,696,257 A | 9/1987 | Neary et al. | |
| 5,259,340 A | 11/1993 | Arbogast | |
| 5,522,347 A | 6/1996 | Merino | |
| 5,564,364 A | 10/1996 | Kovacs et al. | |
| 5,572,950 A | 11/1996 | O'Rourke et al. | |
| 5,673,648 A | 10/1997 | Ayle | |
| 5,806,461 A | 9/1998 | Kiera | |
| 6,202,595 B1 | 3/2001 | Atcravi | |
| 6,295,949 B1 | 10/2001 | Willis | |
| 2004/0129230 A1 | 7/2004 | Northrop et al. | |
| 2005/0211179 A1 | 9/2005 | Lewis | |
| 2006/0005777 A1 | 1/2006 | Galindo et al. | |

FOREIGN PATENT DOCUMENTS

| | | |
|---|---|---|
| JP | 61-197953 | 12/1986 |
| JP | 0161052 | 4/1989 |
| JP | 3000193 | 8/1994 |
| JP | 0826350 | 1/1996 |
| JP | 2002325520 | 11/2002 |
| JP | 2005006605 | 1/2005 |
| JP | 2006101890 | 4/2006 |
| JP | 2007159591 | 6/2007 |

*Primary Examiner* — Rob Swiatek
*Assistant Examiner* — Ebony Evans
(74) *Attorney, Agent, or Firm* — Brinks Hofer Gilson & Lione (57) ABSTRACT

To provide a movable hood which can be opened and closed smoothly even though a distance between the movable hood and a fixed hood is reduced. An animal litter box 1 comprises an evacuation container 2; and a hood 3, the hood 3 having a fixed hood 31, a movable hood 32, and a pair of connecting portions, wherein the movable hood 32 is configured to be moved rotatably outside or inside the fixed hood 31 in the state that an end edge is proximal to the fixed hood 31 with maintaining a prescribed distance, and wherein at least one of the fixed hood 31 and the movable hood 32 is provided with a convex restricting portion 6 which prevents a distance between an end edge on at least the one end of the movable hood 32 and the fixed hood 31 from being less than the prescribed distance.

3 Claims, 9 Drawing Sheets

ANIMAL LITTER BOX

RELATED APPLICATION

This application is a continuation application of U.S. patent application Ser. No. 12/117,370, filed May 8, 2008 to which priority is claimed under 35 U.S.C. §120 and through which priority is claimed under 35 U.S.C. §119 to Japanese Patent Application No. 2007-173554, filed Jun. 29, 2007.

This application is based on and claims the benefit of priority from Japanese Patent Application No. 2007-173554, filed on 29 Jun. 2007, the content of which is incorporated herein by reference.

BACKGROUND OF THE INVENTION

1. Field of the Invention

The present invention relates to an animal litter box.

2. Related Art

Conventionally, as a litter box for animal such as cats, a litter box has been known which is provided with an evacuation container of which upper surface is open and a hood covering an upper side of the evacuation container, the hood having an opening for animal going in and out. For such an animal litter box with a hood, when cleaning up the box, it is necessary to remove the hood or put one's hand into the box from the opening formed on the hood. However, it takes much effort to take off the hood whenever cleaning up the box. Furthermore, it is hard to remove urine or feces of animal completely even though putting one's hand into the box from the opening.

To solve the abovementioned problems, Japanese Unexamined Patent Application, First Publication No. 2002-325520 has disclosed an animal litter box comprising: a hood; a fixed hood covering a half of an evacuation container; and a movable hood covering the other half of the evacuation container, which is formed to move rotatably, wherein the animal litter box is configured to store the movable hood inside or outside of the fixed hood when the movable hood is moved rotatably.

SUMMARY OF THE INVENTION

Regarding an animal litter box including a hood which can be opened and closed, hood which is stored inside or outside of a fixed hood as described in Patent Document 1, a prescribed distance needs to be formed between the movable hood and the fixed hood so that the movable hood can be moved along the inner side or outer side the fixed hood. Here, in a case where the distance between the movable hood and the fixed hood is reduced, when the movable hood is opened or closed, the fixed hood may be contacted with the movable hood and the like due to small flexure or deformation of the fixed hood or the movable hood, which causes the movable hood to be stuck. On the other hand, in a case where the distance between the movable hood and the fixed hood is enlarged, the animal litter box cannot be sealed completely even though the movable hood is closed.

Therefore, the present invention has an object to provide an animal litter box of which a movable hood can be opened and closed smoothly even though a distance between the movable hood and a fixed hood is reduced.

Regarding an animal litter box having a hood which can be opened and closed, hood which consists of a fixed hood and a movable hood, the inventors found a solution for the abovementioned object by providing a convex restricting portion which prevents the distance between a movable hood and a fixed hood from being less than a prescribed distance on the fixed hood and/or the movable hood, thereby accomplishing the present invention. More specifically, the present invention provides the following.

According to the first aspect of the present invention, an animal litter box is provided, which comprises an evacuation container of which an upper surface has an opening and a hood disposed above the evacuation container so as to cover the opening, the hood having a fixed hood disposed on one end of the evacuation container, a movable hood disposed on the other end of the evacuation container, and a pair of connecting portions which connect the movable hood to be moved rotatably, wherein the movable hood is configured to be moved rotatably outside or inside the fixed hood in the state that an end edge on at least the one end of the movable hood is proximal to the fixed hood with maintaining a prescribed distance, and wherein at least one of the fixed hood and the movable hood is provided with a convex restricting portion which prevents a distance between an end edge on at least the one end of the movable hood and the fixed hood from being less than the prescribed distance.

According to the second aspect of the present invention, an animal litter box according to the first aspect is provided, wherein, when the movable hood is in a closed state, the movable hood has an overlapping portion with the fixed hood, and wherein the pair of connecting portions is disposed in a vicinity of an end edge of the evacuation container in the overlapping portion so as to face each other, and connects the movable hood with the fixed hood.

According to the third aspect of the present invention, an animal litter box according to the first aspect or the second aspect is provided, wherein the movable hood is configured to be moved rotatably outside the fixed hood, wherein the restricting part is composed of an inwardly protruding portion which is formed on an inner surface of an end edge on at least the one end on an upper surface of the movable hood, and wherein, on an outer upper surface of the fixed hood, extending from the other end to the one end, a concave guiding groove for guiding the moving of the protruding portion when the movable hood is altered from a closed state to an open state is provided.

According to the fourth aspect of the present invention, an animal litter box according to the first aspect or the second aspect is provided, wherein the movable hood is configured to be moved rotatably outside the fixed hood, and wherein the restricting portion is composed of one or more inwardly protruding portions which are formed on an inner surface of an end edge on at least the one end of the movable hood.

According to the fifth aspect of the present invention, an animal litter box according to the first aspect or the second aspect is provided, wherein the movable hood is configured to be moved rotatably outside the fixed hood, wherein the restricting portion is composed of a convexity which is formed on an outer upper surface of the fixed hood and which extends from the other end to the one end, and wherein a guiding member with a concavity which is hollow upward corresponding to a convex shape of the convexity is provided on an inner surface of an end edge on at least the one end on an upper surface of the movable hood.

According to the animal litter box of the present invention, a movable hood can be opened and closed smoothly even though a distance between the movable hood and a fixed hood is reduced.

DETAILED DESCRIPTION OF THE INVENTION

In the following, an animal litter box of the present invention is described with reference to the drawings based on a first embodiment, which is a preferred embodiment.

Figure 1:
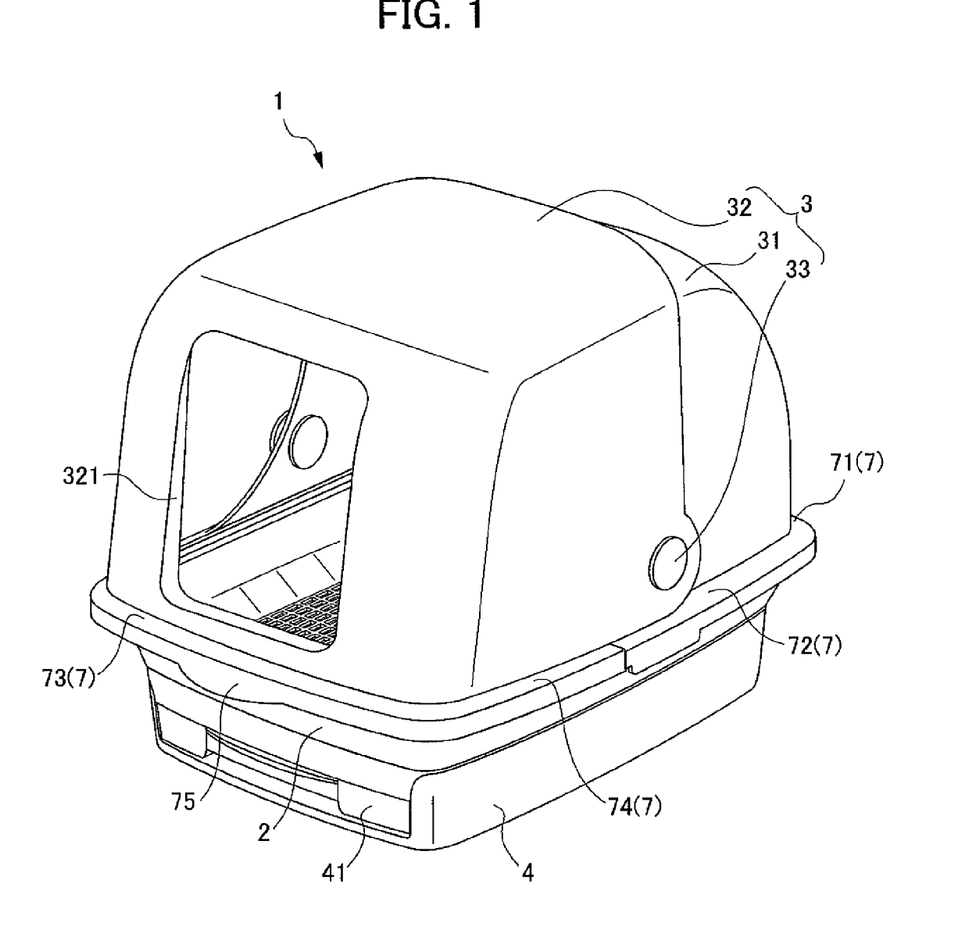
FIG. 1 is a perspective diagram of an animal litter box of the first embodiment of the present invention, which is viewed from a front side with a movable hood being in the closed state.

As shown in FIG. 1, the animal litter box 1 of the first embodiment is provided with an evacuation container 2 of which an upper surface has an opening and a hood 3 disposed on an upper side of the evacuation container 2 so as to cover the opening. The evacuation container 2 is configured to include a bottom part of which shape of the surface is rectangular and sidewalls with a prescribed height which stand in a nearly vertical direction at each four sides which are the rims of the bottom part. The evacuation container 2 is a place where an animal using the animal litter box 1 of the present invention evacuates feces or urine, and granular materials called animal litter (not shown) can be dispersed as appropriate in the evacuation container 2.

The bottom part of the evacuation container 2 is configured to have a liquid permeable capability. In the first embodiment, as shown in FIG. 1, the bottom part has a plurality of rectangular liquid permeable openings, which makes the bottom part gridironed. The shape of the liquid permeable openings is not limited to be rectangular, and may be round, triangle, and the like. In addition, the size of the liquid permeable openings is preferably less than the size of granular materials so that the granular materials dispersed on the bottom part are prevented from dropping downward through the liquid permeable openings. A lower container 4 is disposed under the evacuation container 2. A drawer tray 41 which can be taken out in a horizontal direction is provided in the lower container 4, the drawer tray 41 which can collect liquid such as animal urine going through the bottom part of the evacuation container 2. An upper surface of the drawer tray 41 is open and a bottom part thereof is formed as a nearly rectangular shape. In addition, the bottom part of the drawer tray 41 is configured to be larger than the bottom part of the evacuation container 2. Furthermore, the bottom part of the drawer tray 41 can hold detachably and replaceably an absorbent sheet (not shown) which absorbs liquid such as animal urine going through the bottom part of the evacuation container 2. In the first embodiment, the drawer tray 41 can be taken out from a front side on which an opening 321 (described later) is provided.

Figure 2:
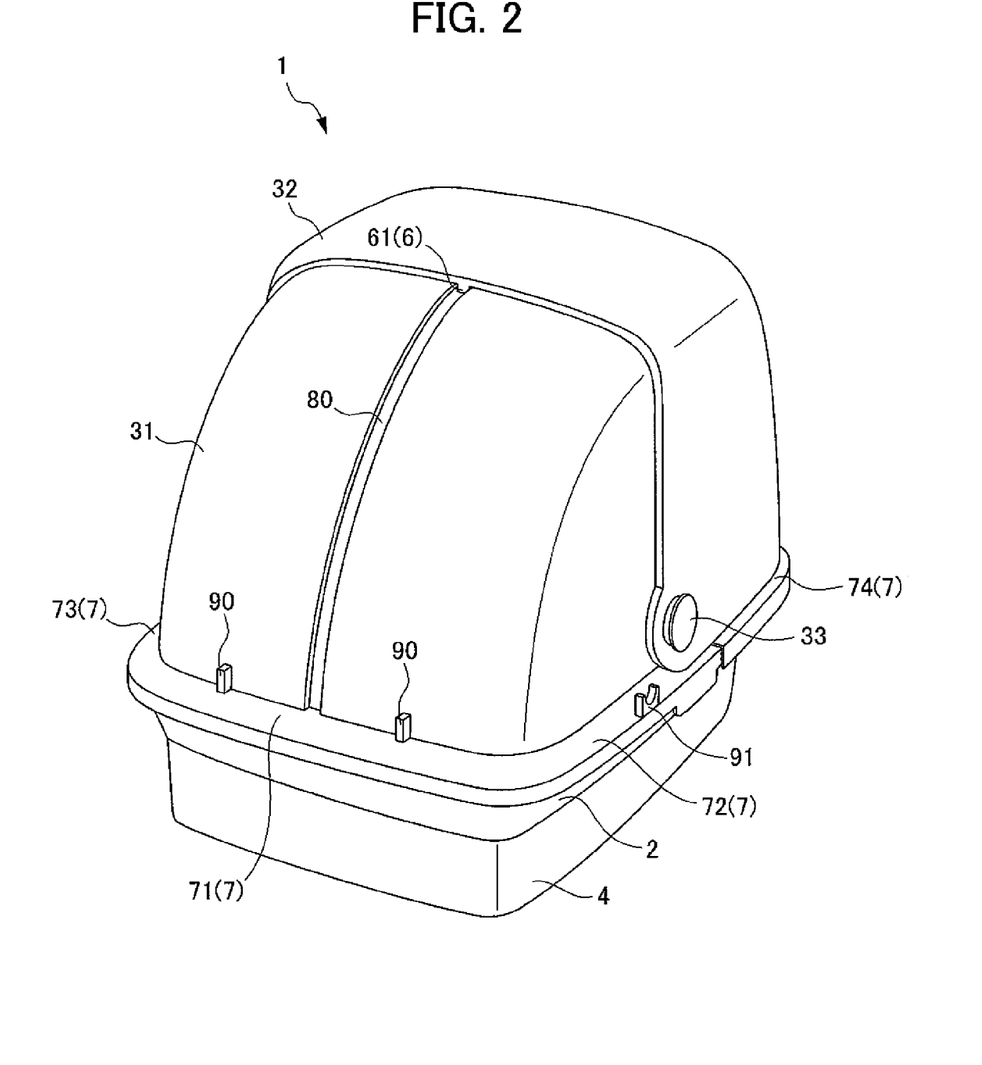
FIG. 2 is a perspective diagram of the animal litter box shown in FIG. 1, which is viewed from a rear side.
Figure 3:
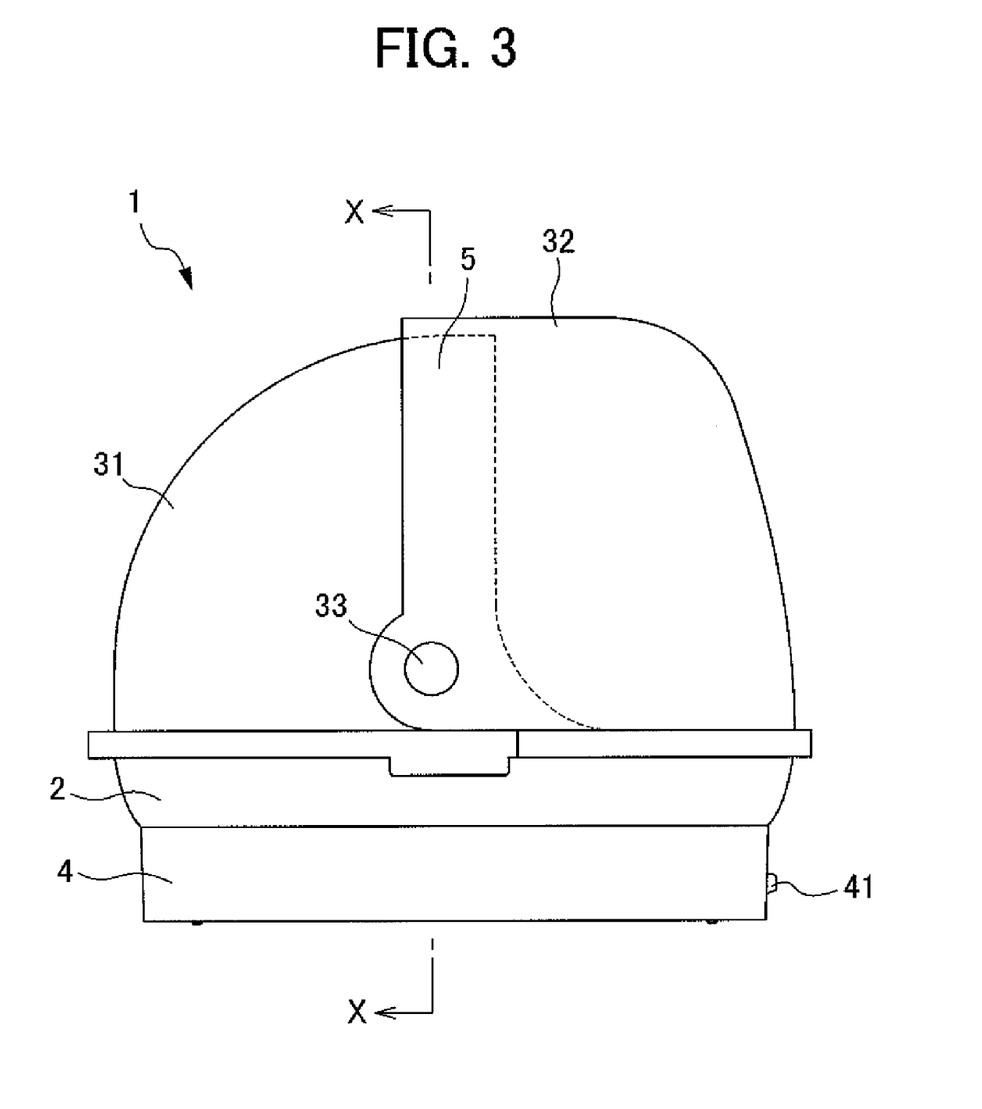
FIG. 3 is a side view of the animal litter box shown in FIG. 1.

As shown in FIGS. 1 to 3, the hood 3 is provided with a fixed hood 31 and a movable hood 32, and is configured such a manner that the fixed hood 31 is disposed on a rear side of the rectangular evacuation container 2, the rear side which is one end of the longitudinal direction, and is fixed with the evacuation container 2, and the movable hood 32 is disposed on a front side of the rectangular evacuation container 2, the front side which is the other end of the longitudinal direction, and has an overlapping portion 5 where the movable hood 32 overlaps with the fixed hood 31. In addition, the fixed hood 31 is connected with the movable hood 32 by a pair of connecting portions 33 at a portion of the overlapping portion 5 where the movable hood 32 overlaps with the fixed hood 31. The movable hood 32 is configured to be moved rotatably.

As shown in FIGS. 1 and 2, in the first embodiment, the fixed hood 31 covers nearly a half of the evacuation container 2 which is equivalent to the rear side of the evacuation container 2, and a top surface of the fixed hood 31 is formed as a nearly a circular arc surface which is curved from the one end of the front side toward the other end of the rear side. In addition, both side surfaces of the fixed hood 31 stand in nearly a vertical direction. Furthermore, the front side and the lower side of the fixed hood 31 is open. The movable hood 32 covers nearly a half of the evacuation container 2 which is equivalent to the front side of the evacuation container 2, and the external form is nearly a rectangular shape. That is, all of the front surface and the both side surfaces located at the front side on the movable hood 32 stands in nearly a vertical direction, and the upper surface of the movable hood 32 is in nearly a horizontal direction. In addition, the rear side and the lower side of the movable hood 32 are open.

As shown in FIGS. 1 and 2, the fixed hood 31 has a protrusion part 7 on an end of the lower side of the fixed hood 31, the protrusion part which protrudes externally in nearly a horizontal direction from the end. More specifically, a rear protrusion part 71 is formed on the end of the rear side on the top surface formed with a curvature of the fixed hood 31, and protrudes externally in the longitudinal direction in nearly a horizontal direction. In addition, a pair of fixed hood side protrusion parts 72 is formed on the lower ends of both side surfaces of the fixed hood 31, each of which protrudes externally in the width direction.

As shown in FIG. 2, a pair of stoppers 90 which protrudes upward toward the movable hood 32 is provided on the rear protrusion part 71. Thus, by providing the stoppers 90 on the rear protrusion part 71, a distance between the end of the rear side of the movable hood 32 and the rear protrusion part 71 is formed when the movable hood 32 is in the open state. Accordingly, in a case where the movable hood 32 is altered from an open state to a closed state, the movable hood 32 can be easily altered from the open state to the closed state by inserting one's finger into the space. The height of the pair of stoppers 90 is preferably 5 to 35 millimeters, and more preferably 15 to 25 millimeters when inserting one's finger into the space thus formed.

One of the pair of the fixed hood side protrusion parts 72 is provided with a shovel holder 91 for holding a shovel (not shown) used when cleaning the animal litter box 1. The shovel holder 91 is provided proximal to an outer edge external to the width direction on the fixed hood side protrusion part 72 so as not to be contacted with the movable hood 32 when the movable hood is moved rotatably.

Similar to the fixed hood 31, the movable hood 32 also has a protrusion part 7 on an end of the lower side of the movable hood 32 in the closed state, the protrusion part which protrudes externally in nearly a horizontal direction from the end. More specifically, as shown in FIG. 1, a front protrusion part 73 is formed on the lower end of the front side of the movable hood 32, and protrudes externally in the longitudinal direction in nearly a horizontal direction. In addition, a pair of the movable hood side protrusion parts 74 is formed on the lower ends of both side surfaces of the movable hood 32, each of which protrudes externally in each width direction. The front protrusion part 73 further protrudes in a longitudinal direction from the center part of the width direction, thus constituting a hood side handle 75 (see FIG. 1). With regard to the animal litter box 1 of the present embodiment, the movable hood 32 can be altered from the closed state to the open state using the hood side handle 75. An outer rim of the hood side handle 75 is formed to be a convexed shape which is curved in a longitudinal direction from a view of flat surface.

The movable hood 32 is provided with the opening 321 which links an inner space of the animal litter box 1 with an outer space at the front surface thereof, whereby an animal can go in and out the animal litter box 1 through the opening 321. The shape of the opening 321 may be square, rectangle, circle, ellipse, and the like, and is not limited to a specific shape as long as it is easy for an animal using the animal litter box 1 to go in and out. In the first embodiment, the opening 321 is formed to be a rectangular shape where a vertical direction is a long side of the rectangle.

As shown in FIG. 3, the fixed hood 31 and the movable hood 32 have the overlapping portion 5 where a vicinity of an end edge of the front side of the fixed hood 31 overlaps with a vicinity of an end edge of the rear side of the movable hood 32 when the movable hood 32 is in the closed state. In addition, the overlapping portion 5 is formed such a manner that the movable hood 32 is located outside of the fixed hood 31. Furthermore, the pair of the connecting portions 33 is provided at a vicinity of an end edge of the lower container in the overlapping portion 5, with facing each other. Thus, the animal litter box 1 of the first embodiment is configured such that, in a case where the movable hood 32 is altered from the open state to the closed state, the movable hood 32 which is located outside of the fixed hood 31 can be moved rotatably with the pair of the connecting portions 33 as an axis. In addition, the pair of the connecting portions 33 may connect the movable hood 32 with the evacuation container 2 so that the movable hood 32 can be moved rotatably.

As shown in FIGS. 3 to 6, regarding the animal litter box 1 of the first embodiment, when the movable hood 32 is in the closed state, an end edge of at least the rear side of the movable hood 32 is proximal to the fixed hood 31 with maintaining a prescribed distance to the fixed hood 31. That is, an inner surface of an end edge of the rear side of the movable hood 32 lies in a vicinity of an outer surface of the fixed hood 31. In addition, as shown in FIG. 3, the top surface of the fixed hood 31 is configured as nearly a circular arc surface of which radius is from the connecting portion 33 to the end of the top surface. Therefore, in a case where the movable hood 32 is altered from the closed state to the open state, the movable hood 32 is configured to be moved outside of the fixed hood 31 with an end edge of at least the rear side of the movable hood 32 being proximal to the fixed hood 31 with maintaining a prescribed distance to the fixed hood 31 (see FIGS. 6 and 7). In addition, the movable hood 32 is formed to be nearly a rectangular shape in the first embodiment. Therefore, in a case where the movable hood 32 is altered from the closed state to the open state, only a part in a vicinity of an end edge of the rear side on the upper surface of the movable hood 32 is moved rotatably with the part being proximal to the fixed hood 31. On the other hand, a rest other than the part in a vicinity of an end edge of the rear side on the upper surface of the movable hood 32 is moved rotatably with the rest being away from the fixed hood 31.

Figure 4:
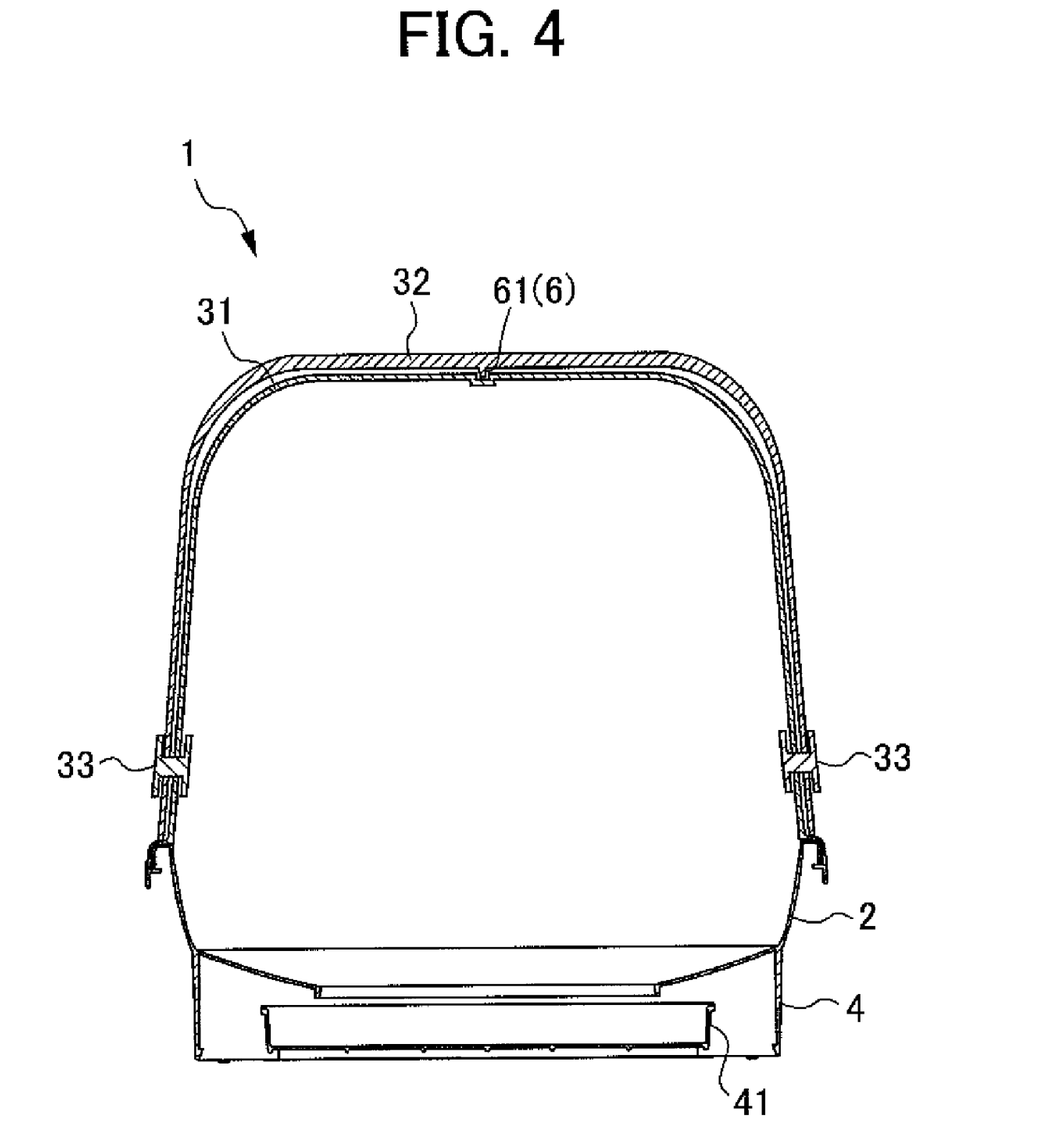
FIG. 4 is a cross-sectional view taken along the line X-X in FIG. 3.
Figure 5:
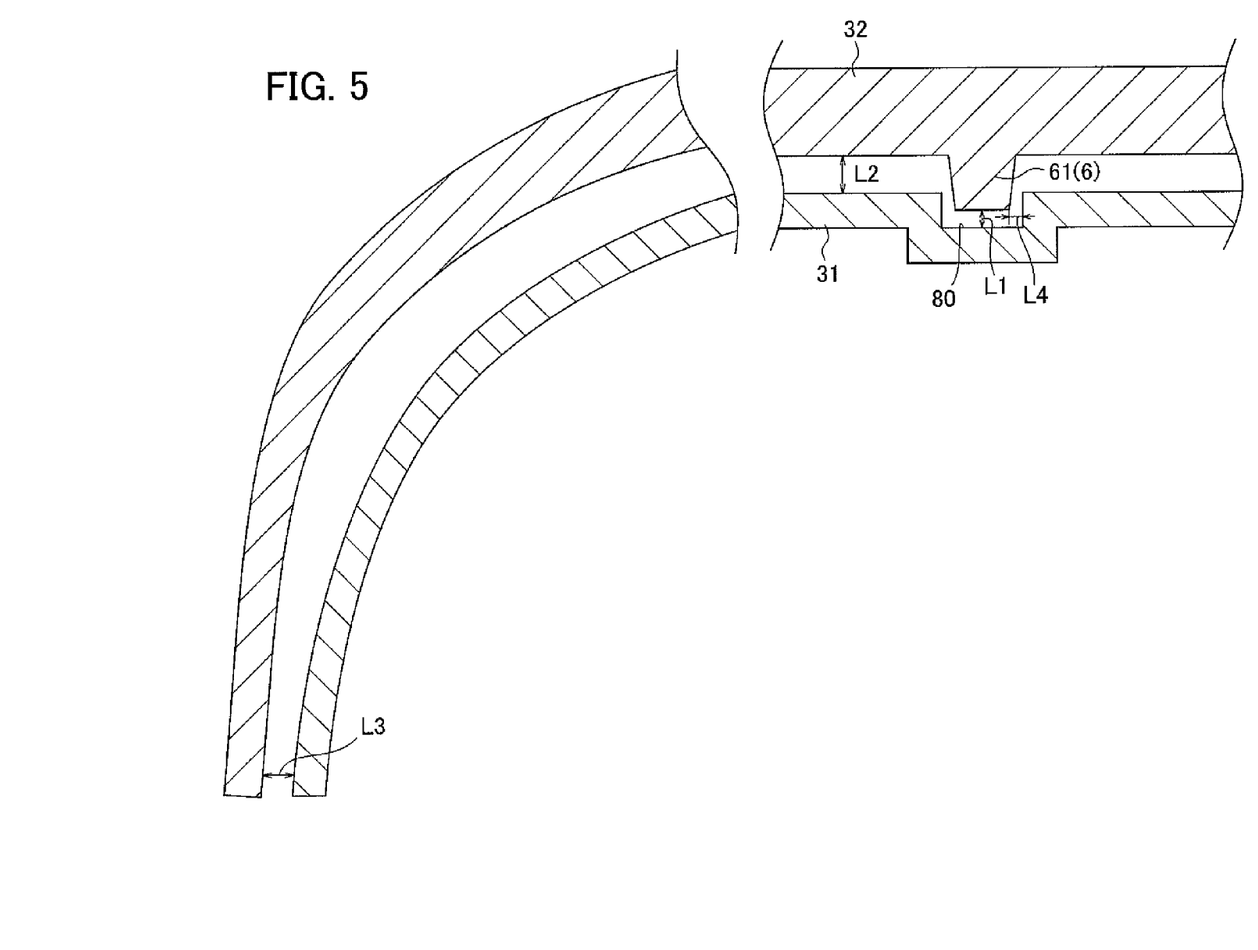
FIG. 5 is a partly enlarged view of FIG. 3.
Figure 6:
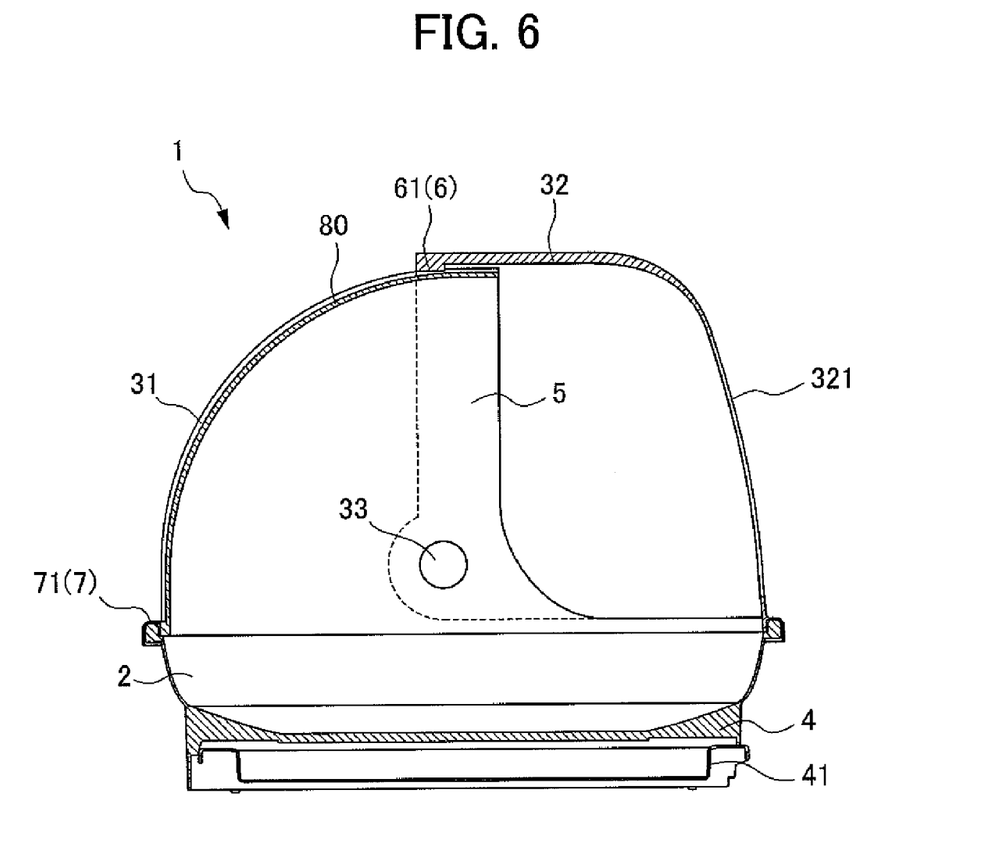
FIG. 6 is a vertical sectional view in an anteroposterior direction of the animal litter box of the first embodiment with the movable hood being in a closed state.
Figure 7:
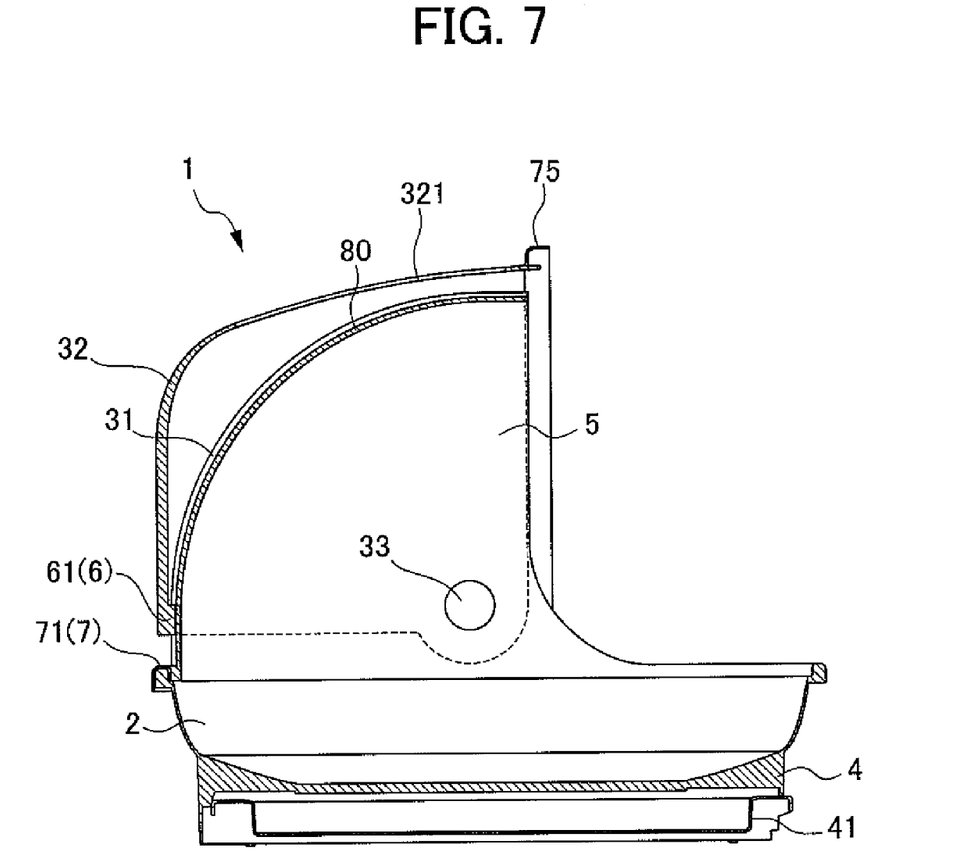
FIG. 7 is a vertical sectional view in an anteroposterior direction of the animal litter box of the first embodiment with the movable hood being in an open state.

The fixed hood 31 and/or the movable hood 32 are provided with a convex restricting portion 6 which prevents the distance between an end edge of at least the rear side of the movable hood 32 and the fixed hood 31 from being less than a prescribed distance. In the first embodiment, as shown in FIGS. 4 to 6, the restricting portion 6 is composed of an inwardly protruding portion 61 which is formed on an inner surface of an end edge of the rear side on the upper surface of the movable hood 32.

Thus, by providing the convex restricting portion 6 to the fixed hood 31 and/or the movable hood 32, a distance L1 where the restricting portion 6 is provided between the movable hood 32 and the fixed hood 31 is less than a distance L2 where the restricting portion 6 is not provided between the movable hood 32 and the fixed hood 31. Accordingly, even in a case where the movable hood 32 or the fixed hood 31 is deformed such as by flexure, the movable hood 32 and the fixed hood 31 are contacted only at the restricting portion 6, thereby preventing those hoods from being closer to each other. Consequently, it can prevent the movable hood 32 from being stuck when it opens and closes, or it can prevent the both hoods from being damaged by friction due to that the movable hood 32 and the fixed hood 31 are deeply contacted with each other.

The distance L2 where the restricting portion 6 is not provided between the inner surface of an end edge of at least the rear side of the movable hood 32 and the outer surface of the fixed hood 31 is preferably 1 to 10 millimeters, and more preferably 1 to 5 millimeters from the standpoint of seal-up of the animal litter box 1 when the movable hood 32 is in the closed state. The distance L1 where the restricting portion 6 is provided between the movable hood 32 and the fixed hood 31 is preferably 0 to 3 millimeters, and more preferably 0 to 1 millimeter.

As shown in FIG. 2, in the first embodiment, a concave guiding groove 80 for guiding the moving of the protruding portion 61 when the movable hood 32 is altered from the closed state to the open state is provided on the outer upper surface of the fixed hood 31, the guiding groove which extends from the front side to the rear side. The guiding groove 80 is formed at nearly a center part of the width direction on the top surface of the fixed hood 31, and formed linearly along a curved shape of the top surface from the end of the front side to the end of the rear side.

It is preferred that width of the guiding groove 80 is formed broader than that of the protruding portion 61 from the standpoint of preventing from slippage to the width direction when the movable hood 32 is opened or closed. More specifically, it is preferably 15 to 50 millimeters. The depth of the guiding groove 80 is preferably 5 to 20 millimeters, and more preferably 5 to 10 millimeters. In addition, from the standpoint described above, it is preferred that a distance L4 in a horizontal direction between the protruding portion 61 and the guiding groove 80 is less than a distance L3 in a horizontal direction between the movable hood 32 on the side surface of the hood 3 and the fixed hood 31 of the hood 3 (see FIG. 5).

As a constituent material for the evacuation container 2, the lower container 4, and the hood 3 which configures the animal litter box 1 of the first embodiment, any type of materials which is normally used for an animal litter box may be used without any limitation. For example, synthetic resin such as polyethylene and polyproplylene can be used.

According to the animal litter box 1 of the first embodiment with the abovementioned configuration, by providing the convex restricting portion 6 to the movable hood 32, even in a case where the movable hood 32 or the fixed hood 31 is deformed such as by flexure, the movable hood 32 and the fixed hood 31 are contacted only at the restricting portion 6, thereby preventing those hoods from being closer to each other. Consequently, it can prevent the movable hood 32 from being stuck when it opens and closes. Therefore, the movable hood 32 can be opened and closed smoothly even though a distance between the movable hood 32 and a fixed hood 31 is reduced.

In addition, a concave guiding groove 80 for guiding the moving of the protruding portion 61 when the movable hood 32 is altered from the closed state to the open state is provided on the outer upper surface of the fixed hood 31, the guiding groove which extends from the front side to the rear side. Therefore, it can prevent from slippage to the width direction when the movable hood 32 is opened or closed, whereby the movable hood 32 can be opened and closed smoothly.

Next, the second embodiment and the third embodiment for an animal litter box of the present invention are described. Regarding the second embodiment and the third embodiment, differences from the first embodiment are mainly described, and the same reference numerals have been retained for similar parts so as to omit overlapping descriptions. The following variations, unless otherwise noted, are similar to the first embodiment.

Figure 8:
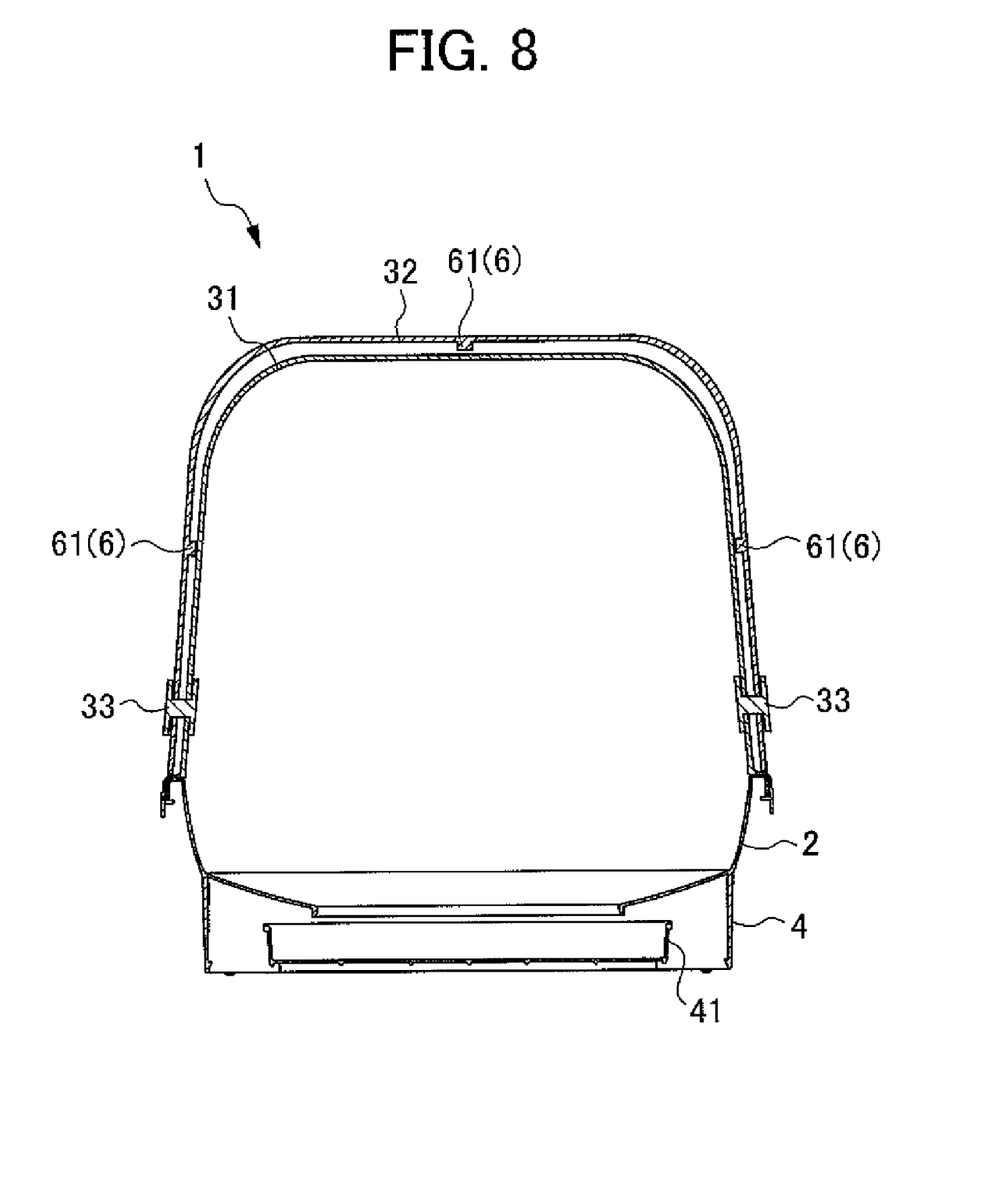
FIG. 8 is a sectional view of an animal litter box of the second embodiment of the present invention, which corresponds to that in FIG. 4.

An animal litter box 1 of the second embodiment is mainly different from that of the first embodiment with regard to the number of restricting portions 6 with which are provided. Regarding the animal litter box 1 of the second embodiment, the restricting portion 6 is composed of one or more inwardly protruding portion 61 which is formed on an inner surface of an end edge of at least the rear side of the movable hood 32. More specifically, as shown in FIG. 8, three protruding portions 61 are provided on the upper surface and both side surfaces of the movable hood 32. In addition, in the second embodiment, the fixed hood 31 is not provided with the guiding groove 80.

According to the animal litter box of the second embodiment, the protruding portions 61 which are the restricting portions 6 are provided to the upper surface and both the side surfaces of the movable hood 32 respectively. Therefore, it can prevent the movable hood 32 from slippage in a vertical direction and a width direction (a horizontal direction) without providing the guiding groove 80 on the fixed hood 31, whereby the movable hood 32 can be opened and closed smoothly.

Figure 9:
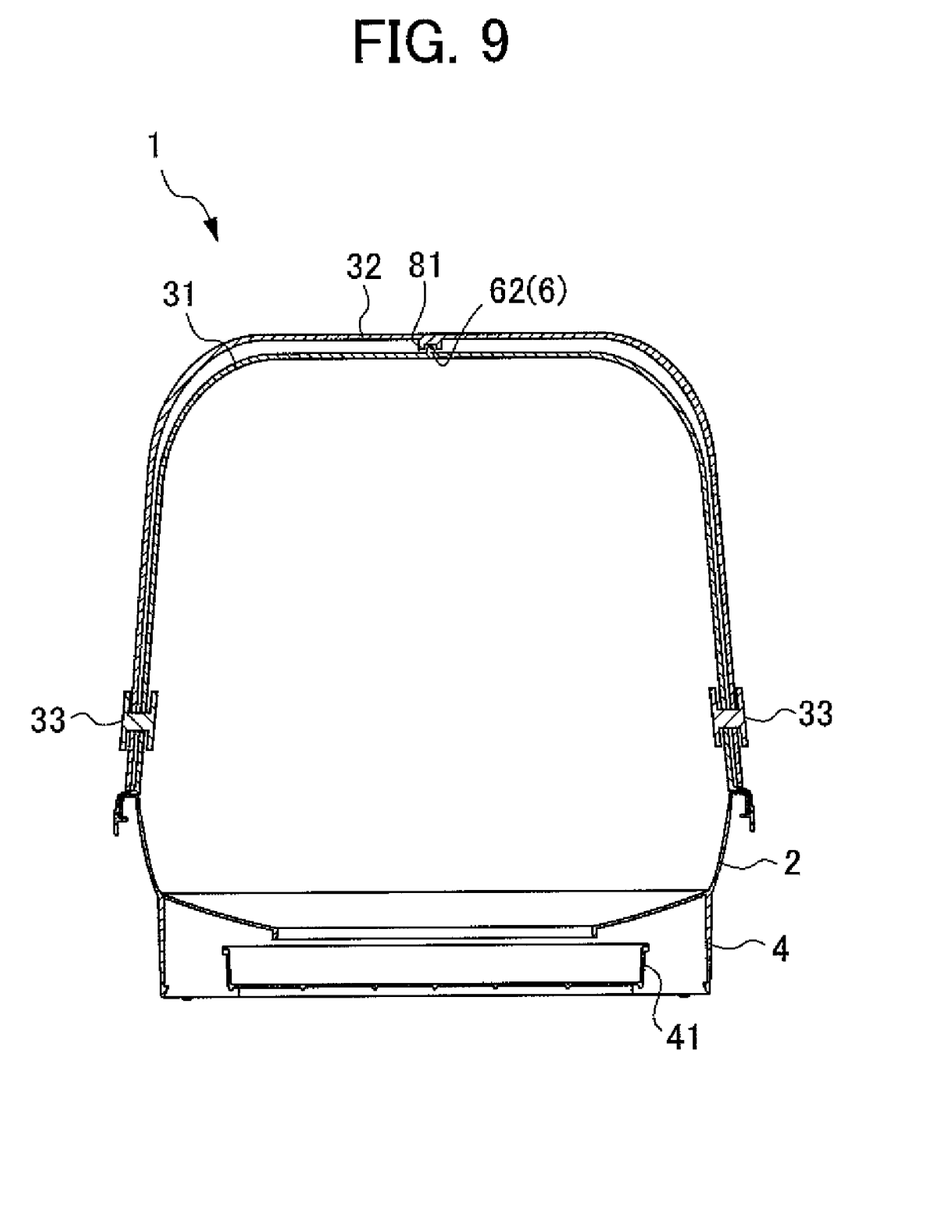
FIG. 9 is a sectional view of an animal litter box of the third embodiment of the present invention, which corresponds to that in FIG. 4.

An animal litter box 1 of the third embodiment is different from the first embodiment in that the restricting portion 6 is provided on the fixed hood 31 and the guiding member 81 is provided on the movable hood 32. As shown in FIG. 9, regarding the animal litter box 1 of the third embodiment, the restricting portion 6 is composed of a convexity 62 which is formed on an outer upper surface of the fixed hood 31 and which extends from the front side to the rear side. The convexity 62 is formed at nearly a center part of the width direction on the top surface of the fixed hood 31, and formed linearly along a curved shape of the top surface from the end of the front side to the end of the rear side. In addition, on an inner surface of an end edge of at least the rear side of the movable hood 32, the guiding member 81 with a concavity which is hollow upward corresponding to a convexed shape of the convexity 62 is provided.

Therefore, the animal litter box 1 of the third embodiment can have the same effect as that of the first embodiment.

An animal litter box of the present invention is not limited to the abovementioned embodiments and can be modified as appropriate without departing from the scope of the present invention. For example, in the first embodiment to the third embodiment, although the movable hood 32 is configured to be moved rotatably outside of the fixed hood 31, the movable hood 32 may be configured to be moved rotatably inside of the fixed hood. In this case, the restricting portion 6 can be provided either on an inner surface of the movable hood 32 or on an outer surface of the fixed hood 31.

In addition, in the first embodiment to the third embodiment, although the movable hood 32 is disposed on the front side of the evacuation container 2 and the fixed hood 31 is disposed on the rear side of the evacuation container 2, the movable hood 32 may be disposed on the rear side of the evacuation container 2 and the fixed hood 31 may be disposed on the front side of the evacuation container 2. In addition, in the first embodiment to the third embodiment, although the movable hood 32 is configured as a rectangular shape, the top surface of the movable hood 32 may be configured as nearly a circular arc surface, which is similar to that of the fixed hood 31.

In addition, in the first embodiment and the second embodiment, although the protruding portion 61 is formed on the inner surface of an end edge of the rear side on the upper surface of the movable hood 32, the protruding portion 61 may be formed so as to extend from an end of the rear side to an front side on the inner surface of an end edge of the rear side on the upper surface of the movable hood 32. In addition, in the second embodiment, although the protruding portion 61 which is the restricting portion 6 is provided on the movable hood 32, the protruding portion 61 may be provided on the fixed hood 31.

In addition, in the first embodiment to the third embodiment, although the evacuation container 2 is provided with the bottom part with a liquid permeable capability and the lower container 4 is disposed under the evacuation container 2, the evacuation container 4 may be without a liquid permeable capability or the lower container 4 may not be disposed under the evacuation container 2.

An animal litter box of the present invention may be used as a litter box for an animal kept as a pet such as cats, dogs, rabbits, and the like. Specifically, an animal litter box of the present invention can be preferably used as a litter box for a cat kept indoor.

What is claimed is:

1. An animal litter box comprising:
   an evacuation container of which an upper surface has an opening; and
   a hood disposed above the evacuation container so as to cover the opening, the hood having a fixed hood disposed on one end of the evacuation container, a movable hood disposed on another end of the evacuation container, and a pair of connecting portions which connect the movable hood to the fixed hood to be moved rotatably,
   wherein the movable hood is configured to be moved rotatably outside or inside the fixed hood so that an end edge on at least one end of the movable hood is proximal to the fixed hood while maintaining a prescribed distance between the fixed hood and the movable hood, and
   wherein at least one of the fixed hood and the movable hood includes:
   a convex restricting portion which prevents a distance between the end edge on at least the one end of the movable hood and the fixed hood from being less than the prescribed distance and;
   a convex guide groove which extends from one side edge to another side edge in a substantially center portion of a transverse direction of the one of the fixed hood or movable hood to guide the convex restricting portion slidably.

2. An animal litter box according to claim 1, wherein, when the movable hood is in a closed state, the movable hood has an overlapping portion with the fixed hood, and wherein each one of the pair of connecting portions is disposed near an end edge of the evacuation container in the overlapping portion so as to face the other connecting portion, and connects the movable hood with the fixed hood.

3. An animal litter box comprising:

an evacuation container of which an upper surface has an opening; and a hood disposed above the evacuation container so as to cover the opening, the hood comprising a fixed hood disposed on one end of the evacuation container, a movable hood disposed on another end of the evacuation container, and a pair of connecting portions which connect the movable hood to the fixed hood to be moved rotatably, wherein the movable hood is configured to be moved rotatably outside the fixed hood so that an end edge on at least one end of the movable hood is proximal to the fixed hood while maintaining a prescribed distance between the fixed hood and the movable hood, and the movable hood includes a convex restricting portion which prevents a distance between an end edge on at least one end of the movable hood and the fixed hood from being less than the prescribed distance and the convex restriction portion includes one or more inwardly protruding portions which are formed on an inner surface at an end edge on the at least one of the movable hood and the fixed hood.

* * * * *